United States Patent
Goyal et al.

(10) Patent No.: US 10,844,280 B2
(45) Date of Patent: Nov. 24, 2020

(54) POLYURETHANE BASED PROPPANT COATINGS

(71) Applicants: Dow Global Technologies LLC, Midland, MI (US); DOW SILICONES CORPORATION, Midland, MI (US)

(72) Inventors: Sachit Goyal, Houston, TX (US); Arjun Raghuraman, Pearland, TX (US); Kaoru Aou, Lake Jackson, TX (US); Juan Carlos Medina, Lake Jackson, TX (US); Lenin Petroff, Bay City, MI (US); James Young, Jr., Midland, MI (US)

(73) Assignees: Dow Global Technologies LLC, Midland, MI (US); DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 16/496,305

(22) PCT Filed: Mar. 21, 2018

(86) PCT No.: PCT/US2018/023460
§ 371 (c)(1),
(2) Date: Sep. 20, 2019

(87) PCT Pub. No.: WO2018/175515
PCT Pub. Date: Sep. 27, 2018

(65) Prior Publication Data
US 2020/0017760 A1    Jan. 16, 2020

Related U.S. Application Data

(60) Provisional application No. 62/474,235, filed on Mar. 21, 2017.

(51) Int. Cl.
| | | |
|---|---|---|
| C09K 8/80 | (2006.01) | |
| E21B 43/267 | (2006.01) | |
| C09D 175/08 | (2006.01) | |
| C08G 18/28 | (2006.01) | |
| C08G 18/61 | (2006.01) | |

(52) U.S. Cl.
CPC ............ C09K 8/805 (2013.01); C09D 175/08 (2013.01); E21B 43/267 (2013.01); *C08G 18/283* (2013.01); *C08G 18/61* (2013.01)

(58) Field of Classification Search
CPC ....... C09D 175/04; C08G 18/10; C08L 75/04; C09K 8/805; C09K 2208/10; C09K 8/62; E21B 43/26; E21B 43/267
See application file for complete search history.

(56) References Cited

U.S. PATENT DOCUMENTS

| | | |
|---|---|---|
| 3,875,086 A | 4/1975 | Ramey et al. |
| 8,993,489 B2 | 3/2015 | McDaniel et al. |
| 9,290,690 B2 | 3/2016 | McDaniel et al. |
| 2007/0066788 A1 | 3/2007 | Hoffmann et al. |
| 2010/0273939 A1 | 10/2010 | Stollmaier et al. |
| 2013/0186624 A1* | 7/2013 | McCrary .............. C09K 8/805 166/280.1 |
| 2014/0060833 A1 | 3/2014 | Kuhlmann et al. |
| 2015/0034314 A1* | 2/2015 | Hudson ................ C09K 8/805 166/276 |
| 2016/0137904 A1* | 5/2016 | Drake .................. C09K 8/524 507/219 |
| 2016/0333259 A1* | 11/2016 | Monastiriotis ........ C09K 8/805 |

FOREIGN PATENT DOCUMENTS

| | | |
|---|---|---|
| WO | 1994/04586 | 3/1994 |
| WO | 2014052459 | 4/2014 |
| WO | 2014092986 | 6/2014 |
| WO | 2014186220 | 11/2014 |
| WO | 2017003813 | 1/2017 |

OTHER PUBLICATIONS

PCT/US2018/023460, International Search Report and Written Opinion dated May 30, 2018.
PCT/US2018/023460, International Preliminary Report on Patentability dated Sep. 24, 2019.

* cited by examiner

*Primary Examiner* — Zakiya W Bates

(57) ABSTRACT

A coated article, such as a proppant, includes a base substrate and one or more polyurethane based coatings on an outer surface of the base substrate. The one or more polyurethane based coatings including the reaction product of an isocyanate component that has at least one isocyanate and an isocyanate-reactive component that has one or more simple polyols and one or more polyether monols at a ratio from 1:18 to 18:1. An isocyanate index is greater than 0.2 and less than 1.0.

10 Claims, No Drawings

POLYURETHANE BASED PROPPANT COATINGS

FIELD

Embodiments relate to polyurethane based coatings for proppants, proppants that have the polyurethane based coatings thereon, methods of making the polyurethane based coatings for use on proppants, and methods of proppants with the polyurethane based coatings.

INTRODUCTION

Well fracturing is a process of injecting a fracturing fluid at high pressure into subterranean formations such as subterranean rocks, well holes, etc., so as to force open existing fissures and extract a crude product such as oil or gas therefrom. Proppants are solid material in particulate form for use in well fracturing. Proppants should be strong enough to keep fractures propped open in deep hydrocarbon formations, e.g., during or following an (induced) hydraulic fracturing treatment. Thus, the proppants act as a "propping agent" during well fracturing. The proppants may be introduced into the subterranean formations within the fracturing fluid. The proppants may be coated for providing enhanced properties such as hardness and/or crush resistance. It is further desired to find coatings that provide further improved proppant flowback control.

Proppant flowback refers to dislodging of proppants followed by transport up a well hole with the flowback water. Such proppant flowback may occur, e.g., during well cleanup or after well completion, and may lead to undesirable deposits (such as in casings) and/or failure of electrical submersible pumps. Further, proppant flowback may negatively impact proppant pack conductivity and/or result in pinching off the well hole. Therefore, there is a need for cost-effective technologies to reduce, minimize, and/or prevent such proppant flowback, while not negatively impacting proppant handling (e.g., remain substantially free-flowing during storage and/or transportation).

SUMMARY

Embodiments may be realized by providing a coated article, such as a proppant, that includes a base substrate and one or more polyurethane based coatings on an outer surface of the base substrate. The one or more polyurethane based coatings including the reaction product of an isocyanate component that has at least one isocyanate and an isocyanate-reactive component that has one or more simple polyols and one or more polyether monols at a ratio from 1:18 to 18:1. An isocyanate index is greater than 0.2 and less than 1.0.

DETAILED DESCRIPTION

A cost advantaged polyurethane based coating for proppants is proposed. In particular, while polyurethane based proppants coats are known, currently available options may be not maintain a reasonable cost advantage for an end user. For example, U.S. Pat. No. 8,993,489 proposes proppants comprising solid proppant core particles, each with an outer surface that is substantially covered with a cured, substantially homogeneous polyurethane coating polyurethane coating that very specifically comprises the polyurethane reaction product of an isocyanate component and a polyol reactant, which polyol reactant is selected from the group consisting of cashew nut oil, cardanol, cardol, a hydroxy-functional polyether, and castor oil, wherein said polyurethane reaction product was made with an excess of said isocyanate relative to said polyol. However, such proppants that are substantially covered by the very specific polyurethane reaction product of the isocyanate and the polyol that is selected from e.g., a hydroxyl functional polyether polyols in this instance, may not be cost advantageous. For example, hydroxyl functional polyether polyols can be expensive to produce, may require a detailed process that includes reaction an oxide such as propylene oxide and/or ethylene oxide with an initiator, in the presence of a specific catalyst. Further, dependent on the catalyst used, substantial further processing may be necessary to form a usable hydroxyl functional polyether polyol. Therefore, use of such a hydroxyl functional polyether polyols may be not be cost advantageous in high volume applications such as coatings for proppants.

Further, in U.S. Pat. No. 8,993,489, while not claimed, it is generally disclosed a polyol component can still contain other compounds containing hydroxyl groups that are known to be useful for making polyurethanes, e.g., hydroxy-functional polyethers, hydroxy-functional polyesters, alcohols or glycols. However, U.S. Pat. No. 8,993,489, fails to provide any workable solution for incorporating less costly alcohols or glycols into a polyurethane based coating for proppants. It has been surprisingly found, that the polyurethane based coating may be prepared using one or more simple polyols having a number average molecular weight that is less than 400 g/mol (e.g., less than 350 g/mol, less than 300 g/mol, less than 250 g/mol, less than 200 g/mol, more than 25 g/mol, more than 50 g/mol, more than 75 g/mol, etc.) and one or more polyether monols having a number average molecular weight that is less than 2000 g/mol (e.g., less than 1750 g/mol, less than 1500 g/mol, less than 1250 g/mol, less than 1000 g/mol, less than 900 g/mol, less than 800 g/mol, less than 700 g/mol, less than 600 g/mol, less than 500 g/mol, less than 400 g/mol, more than 50 g/mol, more than 100 g/mol, more than 200 g/mol, etc.) at a weight ratio from 1:18 to 18:1 (e.g., a ratio from 1:17 to 17:1, from 1:15 to 15:1, from 1:12 to 12:1, from 1:10 to 10:1, from 1:7 to 7:1, from 1:5 to 5:1, from 1:3 to 3:1, from 1:2 to 2:1, etc.). The polyurethane based coating may be prepared at an isocyanate index greater than 0.2 and less than 1.0 (e.g., from 0.3 to 0.9, from 0.3 to 0.8, from 0.3 to 0.7, from 0.4 to 0.6, etc.). The result is a cost advantaged coated article such as a proppant, which may be prepared without negatively impacting performance.

For example, referring to Schematic (1) below the polyurethane coating may be prepared using a simple polyol such as glycerine and a polyether monol such as methoxypolyethylene glycol. It is noted that one of ordinary skill in the art would recognize methoxypolyethylene glycol as having one hydroxyl group so as to be a monol, as opposed to having more than one hydroxyl group.

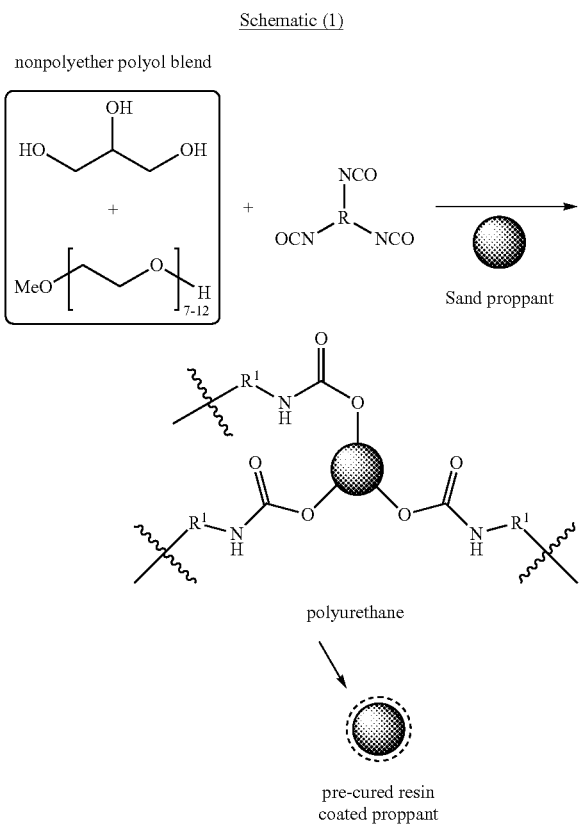

Schematic (1)

The coated article, such as proppant, may include one of more coatings that allow for multiple functions (other exemplary functions include controlled release of an additive and/or removal/recovery/capture of containments). The one or more coatings may comprise from 0.5 wt % to 10.0 wt % (e.g., 0.5 wt % to 5.0 wt %, 0.5 wt % to 4.0 wt %, 0.5 wt % to 3.5 wt %, etc.) of a total weight of the coating article. In exemplary embodiments, coated proppants include the one or more coatings formed on a core (e.g., directly on so as to encompass and/or substantially encompass). The core may be a proppant core, such as sand. The coated article may provide the benefit of being formulated to maintain its properties even when exposed to the temperatures and pressures in down well applications.

The one or more coatings includes at least one polyurethane based coating. The polyurethane based coating may be formed on a pre-formed polymer resin coated article (such as a proppant) or may be formed immediately after and/or concurrent with forming the polyurethane coated article. The polyurethane based coating may be a single layer coating. The polyurethane based coating may include both one or more additives and polyurethane polymers (e.g., the additive may be in a reaction mixture for forming the polyurethane based coating). The additive may be chemically linked to the polymer resin. The single coating may be directly on an outermost surface of the article (such as proppant particle) and/or may form an outermost surface of the coated article. The one or more coating may include one or more underlying coatings (e.g., preformed and/or concurrently formed and optionally a polyurethane based coating) on an outer surface of the proppant particle and an overlying coating (e.g., formed later or concurrently formed and optionally a polyurethane based coating) on the one or more underlying coatings. An underlying coating may be on (e.g., directly on) an outermost surface of the article (such as proppant particle) and the overlying coating may be on (e.g., directly on) the underlying coating, opposing the outermost surface of the article.

The polyurethane based coating may be applied to various articles that include the proppant and/or other base substrates. The polyurethane based coating may act as a permeable polymer resin, with respect to the one or more additives and/or containments. The polyurethane based coating may enable capturing of containments, such as heavy metals and/or sulfides. The polyurethane based coating may enable delayed released of a majority amount of the one or more additives embedded therewithin. For example, at least one additive may be rendered immobile on an outer surface of the proppant particle and/or rendered immobile within the polyurethane based polymer matrix, but as over a period of time the additive may be released/move through the polymer resin coating, so as to be released into the surrounding environment (e.g., into a fracturing fluid).

Polyurethane Based Coatings

The polyurethane based coating may be a coating on (e.g., directly on) an outer surface of an article such as a proppant particle. The coated proppant particle may optional include additional coats/layers, such as on or under the polyurethane based coating. In exemplary embodiments, the polyurethane based coating may include one or more additives embedded on and/or within a polymer resin matrix. The one or more additives may be added during a process of forming the polyurethane based coating and/or may be sprinkled onto a previously coated solid core proppant particle to form the polyurethane based coating in combination with an additive based coating. For example, the one or more additives may be incorporated into an isocyanate-reactive component for forming the polyurethane based coating, an isocyanate component (e.g., a polyisocyanate and/or a prepolymer derived from an isocyanate and a prepolymer formation isocyanate-reactive component) for forming the polyurethane based coating, the prepolymer formation isocyanate-reactive component, and/or a prepolymer derived from an isocyanate and a one component system formation isocyanate-reactive component.

Optionally, the one or more additives may be provided in a carrier polymer when forming the polyurethane based coating. Exemplary carrier polymers include simple polyols (same or different from the simple polyol used to form the polyurethane based coating), polyether polyols, polyester polyols, liquid epoxy resin, liquid acrylic resins, polyacids such as polyacrylic acid, a polystyrene based copolymer resins (exemplary polystyrene based copolymer resins include crosslinked polystyrene-divinylbenzene copolymer resins), Novolac resins made from phenol and formaldehyde (exemplary Novolac resins have a low softening point), and combinations thereof. Additives known to those of ordinary skill in the art may be used. Exemplary additives include moisture scavengers, UV stabilizers, demolding agents, anti-foaming agents, blowing agents, adhesion promoters, curatives, pH neutralizers, plasticizers, compatibilizers, flame retardants, flame suppressing agents, smoke suppressing agents, and/or pigments/dyes.

With respect to the polyurethane based coating, the polymer resin/matrix is the reaction product of an isocyanate component and an isocyanate-reactive component that includes (e.g., consistent essentially of) one or more simple polyols having a number average molecular weight that is less than 400 g/mol and one or more polyether monols having a number average molecular weight that is less than 2000 g/mol.

The simple polyol may have 2 to 6 (e.g., 3 to 6, etc.) hydroxyl groups. The simple polyol may not be a polyether polyol, in other words may not include multiple ether bonds therewithin. By ether bond it is meant C—O—C linkages. The simple polyol may include primary hydroxyls, secondary hydroxyls, and/or combinations thereof. The simple polyol may be a liquid at ambient conditions. In exemplary embodiments, the simple polyol may have a molecular weight from 40 g/mol to 399 g/mol (e.g., 50 g/mol to 375 g/mol, 75 g/mol to 350 g/mol, 100 g/mol to 300 g/mol, 125 g/mol to 250 g/mol, 150 g/mol to 200 g/mol, etc.). The simple polyol may include (e.g., consist essentially of) carbon, oxygen, and hydrogen. The simple polyol may optionally include nitrogen, e.g., so as to be an aminoalcohol. Exemplary simple polyols include glycerine, ethylene glycol, propylene glycol, dipropylene glycol, diethylene glycol, sorbitol, volemitol, threitol, ribitol, mannitol, maltitol, iditol, fucitol, galactitol, arabitol, erythritol, pentaerythritol, trimethylolpropane, triisopropanolamine, diethanolamine, triethanolamine, and bis(hydroxylmethyl) piperazine.

The monol is a polyether monol, in other words includes multiple ether bonds therewithin. The monol has one hydroxyl group, which is distinguished from a polyol having 2 or more hydroxyl groups. The polyether monol may be a liquid at ambient conditions. The polyether monol may be a primary hydroxyl monol. The polyether monol may be derived from propylene oxide, ethylene oxide, and/or butylene oxide. The polyether monol may include from 5 to 85 carbon atoms (e.g., 5 to 75, 10 to 70, 10 to 60, 10 to 50, 10 to 45, 15 to 45, 20 to 40, 20 to 30, etc., carbon atoms). The polyether monol may include (e.g., consist essentially of) carbon, oxygen, and hydrogen. The polyether monol may optionally include nitrogen. Exemplary polyether monols include CARBOWAX™ Methoxypolyethylene glycol 350, CARBOWAX™ Methoxypolyethylene glycol 550, CARBOWAX™ Methoxypolyethylene glycol 750, and UCON™ 50-HB-400, available from The Dow Chemical Company.

A weight ratio of the simple polyol to the polyether monol may be from 1:18 to 18:1. The isocyanate-reactive component may include at least 5 wt %, at least 10 wt %, at least 20 wt %, at least 30 wt %, and/or at least 35 wt % of the simple polyol, based on a total weight of the isocyanate-reactive component. The isocyanate-reactive component may include at least 5 wt %, at least 10 wt %, at least 20 wt %, at least 30 wt %, and/or at least 35 wt % of the polyether monol, based on a total weight of the isocyanate-reactive component.

The isocyanate-reactive component for forming the polyurethane based coating may exclude any polyols selected from the group consisting of cashew nut oil, cardanol, cardol, hydroxy-functional polyether (as referred to as polyether polyol), and castor oil. The hydroxyl functional components of the isocyanate-reactive component may consist essential of the one or more simple polyol and the one or more polyether monol.

The one or more simple polyol, the one or more polyether monol, and optionally one or more additives (such as fillers, catalysts, surfactants, silicone, fumed silica, etc.) may be pre-mixed as a blend prior to forming the polyurethane based coating. For example, the one or more simple polyols, the one or more polyether monols, and the one or more additives may be blended and maintained at ambient conditions (such as 23° C.) to form the pre-made blend. As the pre-mixed blend may be maintained at ambient conditions, the blend may be made well in advance of us in forming the polyurethane based coating and may be storable stable for a period from hours to days.

The mixture for forming the polyurethane based matrix may have an isocyanate index that is at least 0.2 and less than 1.0. The isocyanate index is the equivalents of isocyanate groups (i.e., NCO moieties) present, divided by the total equivalents of isocyanate-reactive groups (e.g., OH moieties) present. Considered in another way, the isocyanate index is the ratio of the isocyanate groups over the isocyanate reactive hydrogen atoms present in a formulation, given as a ratio and may be given as a percentage when multiplied by 100. Thus, the isocyanate index expresses the isocyanate actually used in a formulation with respect to the amount of isocyanate theoretically required for reacting with the amount of isocyanate-reactive hydrogen used in a formulation.

The isocyanate component for forming the polyurethane resin (including a polyurethane/epoxy hybrid based matrix) and/or the polyurethane based undercoat may include one or more polyisocyanates, one or more isocyanate-terminated prepolymer derived from the polyisocyanates, and/or one or more quasi-prepolymers derived from the polyisocyanates. Isocyanate-terminated prepolymers and quasi-prepolymers (mixtures of prepolymers with unreacted polyisocyanate compounds), may be prepared by reacting a stoichiometric excess of a polyisocyanate with at least one polyol. Exemplary polyisocyanates include aromatic, aliphatic, and cycloaliphatic polyisocyanates. According to exemplary embodiments, the isocyanate component may only include aromatic polyisocyanates, prepolymers derived therefrom, and/or quasi-prepolymers derived therefrom, and the isocyanate component may exclude any aliphatic isocyanates and any cycloaliphatic polyisocyanates. The polyisocyanates may have an average isocyanate functionality from 1.9 to 4 (e.g., 2.0 to 3.5, 2.8 to 3.2, etc.). The polyisocyanates may have an average isocyanate equivalent weight from 80 to 160 (e.g., 120 to 150, 125 to 145, etc.) The isocyanate-terminated prepolymer may have a free NCO (isocyanate moiety) of 10 wt % to 35 wt %, 10 wt % to 30 wt %, 10 wt % to 25 wt %, 10 wt % to 20 wt %, 12 wt % to 17 wt %, etc.

Exemplary isocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings. Examples, include modified isocyanates, such as derivatives that contain biuret, urea, carbodiimide, allophonate and/or isocyanurate groups may also be used. Exemplary available isocyanate based products include PAPI™ products, ISONATE™ products and VORANATE™ products, VORASTAR™ products, HYPOL™ products, TERAFORCE™ Isocyanates products, available from The Dow Chemical Company.

The isocyanate-reactive component for forming the polyurethane based coating may further include a catalyst component that includes one or more catalysts. Catalysts known in the art for forming polyurethane polymers and/or coatings may be used. In exemplary embodiments, the catalyst component may be pre-blended with the isocyanate-reactive component, prior to forming a coating.

Exemplary catalysts include, e.g., tin containing catalysts (such as tin carboxylates and organotin compounds), tertiary phosphines, various metal chelates, and metal salts of strong acids (such as ferric chloride, stannic chloride, stannous chloride, antimony trichloride, bismuth nitrate, and bismuth chloride), amines (such as tertiary amines), alkali metal phenolates, alkali metal alkoxides, alkali metal carboxylates, and quaternary ammonium carboxylate salts. The catalyst may be present, e.g., in an amount less than 5 wt %, based on the total weight of the isocyanate-reactive component.

The isocyanate-reactive component for forming the polyurethane based coating may further include an additive component that includes one or more additives. The additives may have various functions, such as enhancing anti-caking properties, heavy mental recovery, sulfide capture, improve physical properties of the coating, etc.

In exemplary embodiments, the additive component may include an anti-block agent (e.g., added towards the end of the coating process after the isocyanate is added) to enhance free flowing properties of coated proppants under various conditions, such as at elevated temperatures and/or pressures that may be experienced during transportation of the coated article such as proppants to a fracturing site. In exemplary embodiments, the anti-blocking agent may include a blend of a silicone liquid and fumed silica. The silicone liquid and/or fumed silica may be in liquid and/or semi-liquid form at ambient conditions. Other exemplary components for the anti-block agent include nepeheline syenite, talc, and/or calcium stearate. The anti-blocking agent may be added to an outermost coating on the coated article, e.g., to an outermost polyurethane based coating.

According to exemplary embodiments, the silicone liquid and fumed silica may be added during the process of forming the one or more coatings for the coated article. The silicone liquid and fumed silica may be added after the components for forming the polyurethane based coating, but before the mixing is stopped and the coated article is allowed to cool. For example, the silicone liquid and fumed silica may be the final components added during a process of forming the coated article.

The silicone liquid may be added to one or more of the polyurethane based coatings. For example, the silicone liquid may be added in an amount of less than 10,000 parts per million, less than 5,000 parts per million, less than 3,000 parts per million, and/or less than 2,000 parts per million based on the total weight of the coated article (e.g., the coated proppants). The total weight of the coated article is calculated as the total weight of the base substrate and the total weight of formulations for all the coatings formed on the base substrate. The silicone liquid may be added in an amount of less than 3,000 parts per million, less than 2,000 parts per million, less than 1,000 parts per million based on the total weight of the base substrate (such as sand) used to form the coated article. The silicone liquid may be added during the process of forming the coated article. The silicone liquid may be carbinol functional silicone fluid as defined by at least one of the Structures 1(a) and 1(b), as shown below:

Structure 1(a)

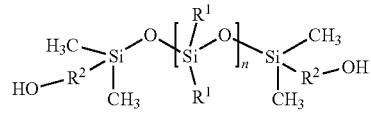

Structure 1(b)

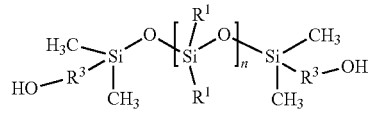

Referring to Structures 1(a) and 1(b), each $R^1$ is a methyl, ethyl, propyl, or phenyl (in exemplary embodiments $R^1$ is methyl). Each $R^1$ may be independent of another $R^1$, e.g., may be the same, or different, and is not limited (e.g., a methyl and a methyl, or a methyl and a phenyl, or a methyl and a ethyl, etc.) Referring to Structures 1(a) and 1(b), n is an integer from 2 to 200 (e.g., 10 to 30). Referring to Structure 1(a), $R^2$ is a branched or linear (in exemplary embodiments preferably $R^2$ is linear) hydrocarbylene comprising from 2 to 100 carbon atoms (e.g., 3 to 20 carbon atoms). Referring to Structure 1(b), $R^3$ has the Structure 2, as shown below:

Structure 2

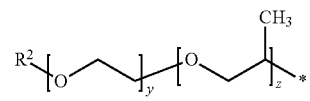

Referring to Structure 2, y is an integer from 0 to 50 and z is an integer from 0 to 50.

Exemplary carbinol functional silicone fluids are Dow Corning® 5562 Carbinol and Dow Corning® 5558 Fluid, available from The Dow Chemical Company.

Fumed silica may be added to one or more of the polyurethane based coatings. The fumed silica may be added in amounts of less than 2.0 wt % (e.g., less than 1.0 wt %, less than 0.5 wt %, less than 0.4 wt %) based on a total weight of the coated article (e.g., the coated proppants). The amount of the fumed silica may be from 0.1 wt % to 1.9 wt %, from 0.1 wt % to 1.5 wt %, from 0.1 wt % to 1.0 wt %, from 0.1 wt % to 0.5 wt %, from 0.1 wt % to 0.4 wt %, etc. The fumed silica may be in the form of a dispersion that is a liquid at ambient conditions. The fumed silica may have a viscosity of less than or equal to 1000 mPa·s (at 23° C. and 100 s$^{-1}$). The fumed silica may have a mean aggregate particle size of from 0.01 µm to 0.50 µm (e.g., 0.05 µm to 0.40 µm, 0.05 µm to 0.30 µm, 0.10 µm to 0.20 µm, etc.). The fumed silica may be a hydrophilic fumed silica. The fumed silica may have a $SiO_2$ (also referred to as silicon dioxide and silica) content of 10 wt % to 40 wt % (e.g., 15 wt % to 40 wt %, 20 wt % to 40 wt %, 25 wt % to 35 wt %, etc.), based on a total weight of the fumed silica dispersion.

Other Coatings/Functions

The coated particle may include coatings in addition to the polyurethane based coating prepared using the one or more simple polyol and the one or more polyether monol and/or additional functions embedded within the polyurethane based coating prepared using the one or more simple polyol and the one or more polyether monol. The one or more polyurethane based coatings prepared using the one or more simple polyol and the one or more polyether monol may account for at least 0.5 wt %, at least 1.0 wt %, at least 1.5 wt %, at least 2.0 wt %, and/or up to 10 wt % of the total weight of the coated article such as coated proppant. A total amount of all the optional coatings may be from 0.5 wt % to 9.5 wt % (e.g., 1.0 wt % to 4.0 wt %, 1.0 wt % to 3.5 wt %, 1.5 wt % to 3.0 wt %, 2.0 wt % to 3.0 wt %, etc.), based on the total weight of the coated article such as coated proppant.

For example, a controlled release polymer resin based coating such as discussed in in priority document U.S. Provisional Patent Application No. 62/312,113, which may be the top coat (outermost coating) forming the coated article such as proppant particle. The controlled released polymer resin based coating includes one or more well treatment agents that are embedded in a polymer resin matrix, the matrix may include the polyurethane based material described above and/or a polyurethane resin, epoxy resin, phenolic resin, and/or furan resin. The controlled release polymer resin based coating may be an additional coating or such function may be embedded within the polyurethane based coating prepared using the one or more simple polyol and the one or more polyether monol.

Exemplary well treatment agents scale inhibitors, wax inhibitors, pour point depressants, asphaltene inhibitors, asphaltene dispersants, corrosion inhibitors, biocides, viscosity modifiers, and de-emulsifiers. The exemplary well treatment agents are described as follows: (1) With respect to scale inhibitor, it is meant a chemical additive that acts to reduce the rate of and/or prevent the precipitation and aggregation of slightly insoluble formations on the walls of systems, e.g., systems used in a well fracturing process. (2) With respect to wax inhibitor, it is meant a chemical additive that acts to reduce the rate of and/or prevent the precipitation out of wax and/or paraffin from a fluid, e.g., the wax and/or paraffin may be a natural compound found in the crude product obtained during a well fracturing process. (3) With respect to pour point depressant, it is meant a chemical additive that lowers the pour point of a crude product obtained during a well fracturing process, whereas the pour point is the lowest temperature at which the product will pour when cooled under defined conditions and may be indicative of the amount of wax in the product (at low temperatures the wax may separate, inhibiting flow). (4) With respect to asphaltene inhibitor, it is meant a chemical additive that acts to reduce the rate of and/or prevent the precipitation out of asphaltene (such as destabilized asphaltene), e.g., whereas asphaltene molecules may be found in the crude product obtained during a well fracturing process. (5) With respect to asphaltene dispersant, it is meant a chemical additive that acts to increase the fluidity of the crude product that includes precipitated asphaltene, e.g., whereas asphaltene molecules may be found in the crude product obtained during a well fracturing process. (6) With respect to corrosion inhibitor, it is meant a chemical additive that acts to reduce the rate of and/or prevent corrosive effect of acids on metals and/or metal alloy based components used in systems, e.g., systems used in a well fracturing process. (7) With respect to biocide (also referred to as a disinfectant), it is meant a chemical additive that acts to reduce the rate of and/or prevent the growth of bacteria/microbes in the well, which bacteria may interfere with a process, e.g., a well fracturing process. (8) With respect to viscosity modifier (also referred to as a viscosity improver), it is meant a chemical additive that is sensitive to temperature, e.g., such that at low temperatures, the molecule chain contracts and does not impact the fluid viscosity and at high temperatures the molecule chain relaxes and an increase in viscosity occurs. (9) With respect to de-emulsifier (also referred to as emulsion preventors), it is meant a chemical additive that reduces and/or minimizes interfacial tensions within the crude product obtained during a well fracturing process. For example, the de-emulsifier may lower the shear viscosity and the dynamic tension gradient of an oil-water interface in the crude product.

For example, a heavy metal recovery coating such as discussed in priority document U.S. Provisional Patent Application No. 62/186,645 and/or a sulfide recovery coating such as discussed in priority document U.S. Provisional Patent Application No. 62/287,037 may be included. The heavy metal recovery coating and/or sulfide recovery coating may independently be an additional coating or such function may be embedded within the polyurethane based coating prepared using the one or more simple polyol and the one or more polyether monol.

The heavy metal recovery coating may have heavy metal recovery crystals embedded within a polymer resin matrix. The metal sulfate crystals on the proppant particle may aid in heavy metal recovery by causing heavy metals, such as particles of radioactive radium, to partition onto the coated proppant and away from the contaminated water. The selective post-precipitation of heavy metals such radium ions onto previously formed crystals (e.g., barite crystals) by lattice replacement (lattice defect occupation), adsorption, or other mechanism, is distinctly different from other capture modes such as zeolites, ion exchange, or molecular sieving. The crystals, such as barium sulfate, may include an anion that is a well-defined polyatomic structures that is not connected to one another by covalent bonds. For example, the post precipitation of heavy metals such as radium on pre-formed barite crystals is selective for radium because of similar size and electronic structure of radium and barium. In exemplary embodiments, the heavy metal recovery crystals may form a crystalline structure that is appropriately sized to hold the heavy metals such as radium thereon or therewithin. Therefore, the heavy metal recovery crystals may pull the radium out of fracturing fluid and hold the ions on or within the heavy metal recovery coating, so as to reduce radium content in the fracturing fluid.

The sulfide recovery coating may provide a system in which sulfides such as hydrogen sulfide may be removed from contaminated water, e.g., can be absorbed into/onto a matrix and/or may be chemically altered. For example, the sulfide may be chemically altered to form sulfur dioxide. The sulfide capturing agent may be embedded within a polymer resin matrix, which is coated onto a proppant particle, such that optionally the sides of the sulfide capturing agent are encapsulated by the polymer resin. The sulfide capturing agent on the proppant particle may aid in the recovery and/or removal of sulfides from the contaminated water. The sulfide capturing agents (e.g., sulfide capturing crystals) are solids at room temperature (approximately 23° C.). The sulfide capturing crystals may have a melting point greater than 500° C., greater than 800° C., and/or greater than 1000° C. The sulfide capturing agents, such as the sulfide capturing crystals, may have an average particle size of less than 5 µm (e.g., less than 4 µm, less than 2 µm, less than 1 µm, etc.). The polymer resin matrix having the sulfide capturing agent may act as a permeable or semi-permeable polymer resin, with respect to hydrogen sulfide and/or sulfur ions. For example, the hydrogen sulfide and/or sulfur ions may be rendered immobile on an outer surface of the proppant particle and/or rendered immobile within the polymer resin matrix. The polymer resin matrix, polymer coating, and/or the process used to prepare coated proppants may be designed to retain captured sulfide on or within the coatings of the proppants and keep the product in the fracture.

In exemplary embodiments, the sulfide recovery coating may include both the sulfide capturing agent and the heavy metal recovery crystals embedded within a same polymer resin matrix, to form both the sulfide recovery coating and the heavy mental recovery coating.

For example, under, over, or combined with the polyurethane based coating prepared using the simple polyol and the polyether monol, the coated article may include at least one amide based coating, as discussed in U.S. Provisional Patent Application No. 62/347,252. In particular, the amide based coating may be an amide copolymer coating.

The amide based coating may be derived from the reaction between a carboxylic acid and an isocyanate, which results in an amide bond and $CO_2$ gas. The isocyanate-reactive component for forming the amide based coating includes one or more carboxylic acids, e.g., one or more poly-carboxylic acids. For example, the isocyanate-reactive component may include one or more poly-carboxylic acids (such as a simple carboxylic acid and/or a poly-carboxylic acid copolymer) that has a number average molecular weight from 90 g/mol to 10,000 g/mol. For example, the one or more poly-carboxylic acids may include one or more simple poly-carboxylic acids (also referred to as a poly-carboxylic acid monomers) such as a dicarboxylic acid and a tricarboxylic acid such as citric acid. For example, the dicarboxylic acid may have the general formula $HO_2C(CH_2)_n CO_2H$.

For example, the one or more poly-carboxylic acids may include one or more poly-carboxylic acid copolymers that include two or more carboxylic acid end groups and a polymer backbone. Whereas, the carboxylic acid end groups may be referred to as a measure of the nominal carboxylic acid functionality of the copolymer. For example, the nominal carboxylic acid functionality may be from 2 to 8 (e.g., 2 to 6, 2 to 5, 2 to 4, and/or 2 to 3). For example the backbone may be an ether, ester, and/or carbonate based backbone. The ether, ester, and/or carbonate backbone may be non-reactive with the isocyanate-component. For example, the ether backbone may be a polyether derived from reaction of propylene oxide, ethylene oxide, and/or butylene oxide with an initiator. The ether backbone may have a number average molecular weight from 60 g/mol to less than 9950 g/mol. The poly carboxylic acid copolymer may be the reaction product of one or more polyether polyols and one or more anhydrides. Furthermore, the poly carboxylic acid can be derived from polyether polyols by direct oxidation of alcohol end groups. The one or more poly-carboxylic acids may be pre-made as a blend prior to forming the coating. For example, at least one poly-carboxylic acid copolymer and at least one poly-carboxylic acid monomer may be blended and maintained at a high temperature, such as at least 80° C.) over an extended period of time (such as at least 2 hours) to form the pre-made blend.

For example, under, over, or combined with the polyurethane based coating prepared using the simple polyol and the polyether monol, the coated article, may be at least one additional coating/layer derived from one or more preformed isocyanurate tri-isocyanates, as discussed in U.S. Provisional Patent Application No. 62/140,022. In embodiments, the additional layer is derived from a mixture that includes one or more preformed isocyanurate tri-isocyanates and one or more curatives. The preformed isocyanurate tri-isocyanate may also be referred to herein as an isocyanate trimer and/or isocyanurate trimer. By preformed it is meant that the isocyanurate tri-isocyanate is prepared prior to making a coating that includes the isocyanurate tri-isocyanate there within. Accordingly, the isocyanurate tri-isocyanate is not prepared via in situ trimerization during formation of the coating. In particular, one way of preparing polyisocyanates trimers is by achieving in situ trimerization of isocyanate groups, in the presence of suitable trimerization catalyst, during a process of forming polyurethane polymers. For example, the in situ trimerization may proceed as shown below with respect to Schematic (a), in which a diisocyanate is reacted with a diol (by way of example only) in the presence of both a urethane catalyst and a trimerization (i.e. promotes formation of isocyanurate moieties from isocyanate functional groups) catalyst. The resultant polymer includes both polyurethane polymers and polyisocyanurate polymers, as shown in Schematic (a), below.

Schematics (a) and (b)

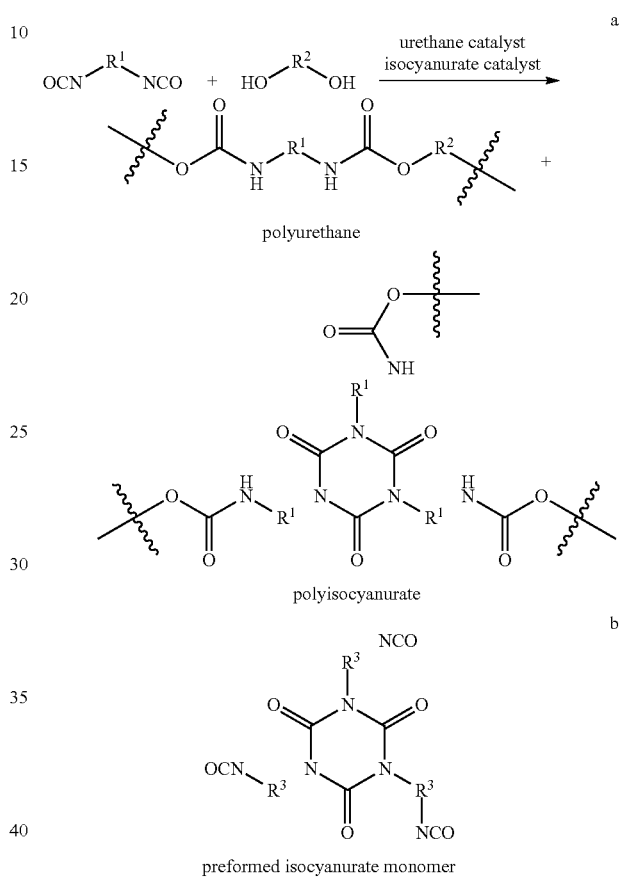

polyurethane polyisocyanurate preformed isocyanurate monomer

In contrast, referring to Schematic (b) above, in embodiments the preformed isocyanurate tri-isocyanate is provided as a separate preformed isocyanurate-isocyanate component, i.e., is not mainly formed in situ during the process of forming polyurethane polymers. The preformed isocyanurate tri-isocyanate may be provided in a mixture for forming the coating in the form of a monomer, and not in the form of being derivable from a polyisocyanate monomer while forming the coating. For example, the isocyanate trimer may not be formed in the presence of any polyols and/or may be formed in the presence of a sufficiently low amount of polyols such that a polyurethane forming reaction is mainly avoided (as would be understand by a person of ordinary skill in the art). With respect to the preformed isocyanurate tri-isocyanate, it is believed that the existence of isocyanurate rings leads to a higher crosslink density. Further, the higher crosslink density may be coupled with a high decomposition temperature of the isocyanurate rings, which may lead to enhanced temperature resistance. Accordingly, it is proposed to introduce a high level of isocyanurate rings in the coatings for proppants using the preformed isocyanurate tri-isocyanates.

For example, the additional layer may include one or more preformed aliphatic isocyanate based isocyanurate tri-isocyanates, one or more preformed cycloaliphatic isocyanate based isocyanurate tri-isocyanates, or combinations thereof. In exemplary embodiments, the additional layer is derived from at least a preformed cycloaliphatic isocyanate based isocyanurate tri-isocyanate, e.g., the preformed cycloaliphatic isocyanate based isocyanurate tri-isocyanate may be present in an amount from 80 wt % to 100 wt %, based on the total amount of the isocyanurate tri-isocyanates used in forming the additional layer.

Exemplary preformed isocyanurate tri-isocyanates include the isocyanurate tri-isocyanate derivative of 1,6-hexamethylene diisocyanate (HDI) and the isocyanurate tri-isocyanate derivative of isophorone diisocyanate (IPDI). For example, the isocyanurate tri-isocyanates may include an aliphatic isocyanate based isocyanurate tri-isocyanates based on HDI trimer and/or cycloaliphatic isocyanate based isocyanurate tri-isocyanates based on IPDI trimer. Many other aliphatic and cycloaliphatic di-isocyanates that may be used (but not limiting with respect to the scope of the embodiments) are described in, e.g., U.S. Pat. No. 4,937,366. It is understood that in any of these isocyanurate tri-isocyanates, one can also use both aliphatic and cycloaliphatic isocyanates to form an preformed hybrid isocyanurate tri-isocyanate, and that when the term "aliphatic isocyanate based isocyanurate tri-isocyanate" is used, that such a hybrid is also included.

The one or more curatives (i.e., curative agents) may include an amine based curative such as a polyamine and/or an hydroxyl based curative such as a polyol. For example the one or more curatives may include one or more polyols, one or more polyamines, or a combination thereof. Curative known in the art for use in forming coatings may be used. The curative may be added, after first coating the proppant with the preformed aliphatic or cycloaliphatic isocyanurate tri-isocyanate. The curative may act as a curing agent for both the top coat and the undercoat. The curative may also be added, after first coating following the addition of the preformed aliphatic or cycloaliphatic isocyanurate tri-isocyanate in the top coat.

Various optional ingredients may be included in the reaction mixture for forming the polyurethane based coating and/or the above discussed additional coating/layer. For example, reinforcing agents such as fibers and flakes that have an aspect ratio (ratio of largest to smallest orthogonal dimension) of at least 5 may be used. These fibers and flakes may be, e.g., an inorganic material such as glass, mica, other ceramic fibers and flakes, carbon fibers, organic polymer fibers that are non-melting and thermally stable at the temperatures encountered in the end use application. Another optional ingredient is a low aspect ratio particulate filler, which is separate from the proppant. Such a filler may be, e.g., clay, other minerals, or an organic polymer that is non-melting and thermally stable at various temperatures. Such a particulate filler may have a particle size (as measured by sieving methods) of less than 100 μm. With respect to solvents, the undercoat may be formed using less than 20 wt % of solvents, based on the total weight of the isocyanate-reactive component.

Proppants

Exemplary proppants (e.g., proppant particles) include silica sand proppants and ceramic based proppants (for instance, aluminum oxide, silicon dioxide, titanium dioxide, zinc oxide, zirconium dioxide, cerium dioxide, manganese dioxide, iron oxide, calcium oxide, and/or bauxite). Various other exemplary proppant material types are mentioned in literature, such as glass beads, walnut hulls, and metal shot in, e.g., Application Publication No. WO 2013/059793, and polymer based proppants as mentioned by U.S. Patent Publication No. 2011/0118155. The sand and/or ceramic proppants may be coated with a resin to, e.g. to improve the proppant mesh effective strength (e.g., by distributing the pressure load more uniformly), to trap pieces of proppant broken under the high downhole pressure (e.g., to reduce the possibility of the broken proppants compromising well productivity), and/or to bond individual particles together when under the intense pressure and temperature of the fracture to minimize proppant flowback. The proppants to be coated may have an average particle size from 50 μm to 3000 μm (e.g., 100 μm to 2000 μm).

Proppant particle (grain or bead) size may be related to proppant performance. Particle size may be measured in mesh size ranges, e.g., defined as a size range in which 90% of the proppant fall within. In exemplary embodiments, the proppant is sand that has a mesh size of 20/40 and/or 20/30. Lower mesh size numbers correspond to relatively coarser (larger) particle sizes. Coarser proppants may allow higher flow capacity based on higher mesh permeability. However, coarser particles may break down or crush more readily under stress, e.g., based on fewer particle-to-particle contact points able to distribute the load throughout the mesh. Accordingly, coated proppants are proposed to enhance the properties of the proppant particle.

The performance of coatings for proppants, especially in downwell applications at higher temperatures (such as greater than 120° C.) and elevated pressures (such as in excess of 6000 psig), may be further improved by designing coatings that retain a high storage modulus at temperatures of up to at least 175° C., which may be typically encountered during hydraulic fracturing of deep strata. The coating may have a glass transition temperature greater than at least 140° C., e.g., may not realize a glass transition temperature at temperatures below 160° C., below 200° C., below 220° C., below 240° C., and/or below 250° C. The resultant coating may not realize a glass transition temperature within a working temperature range typically encountered during hydraulic fracturing of deep strata. For example, the resultant coating may not realize a glass transition temperature within the upper and lower limits of the range from 25° C. to 250° C. Accordingly, the coating may avoid a soft rubbery phase, even at high temperatures (e.g., near 200° C. and/or near 250° C.). For example, coatings that exhibit a glass transition temperature within the range of temperatures typically encountered during hydraulic fracturing of deep strata, will undergo a transition from a glassy to rubbery state and may separate from the proppant, resulting in failure.

Coating Process of Proppants

To coat the article such as the proppant, in exemplary embodiments any optional undercoat layer (e.g., a polyurethane based layer) may be formed first. Thereafter, the polyurethane based coating may be formed on (e.g., directly on) the article/proppant and/or the optional underlying undercoat. In a first stage of forming coated proppants, solid core proppant particles (e.g., which do not have a previously formed resin layer thereon) may be heated to an elevated temperature. For example, the solid core proppant particles may be heated to a temperature from 50° C. to 180° C., e.g., to accelerate crosslinking reactions in the applied coating. The pre-heat temperature of the solid core proppant particles may be less than the coating temperature for the coatings formed thereafter. For example, the coating temperature may be from 40° C. to 170° C. In exemplary embodiments, the coating temperature is at least 85° C. and up to 170° C.

Next, the heated proppant particles may be sequentially blended (e.g., contacted) with the desired components for forming the one or more coatings, in the order desired. For example, the proppant particles may be blended with a formulation that includes one or more additives. Next, the proppant particles may be blended with a first isocyanate-reactive component in a mixer, and subsequently thereafter other components for forming the desired one or more coatings. In exemplary embodiments, a process of forming the one or more coatings may take less than 10 minutes, after the stage of pre-heating the proppant particles and up until right after the stage of stopping the mixer.

The mixer used for the coating process is not restricted. For example, as would be understood by a person of ordinary skill in the art, the mixer may be selected from mixers known in the specific field. For example, a pug mill mixer or an agitation mixer can be used. The mixer may be a drum mixer, a plate-type mixer, a tubular mixer, a trough mixer, or a conical mixer. Mixing may be carried out on a continuous or discontinuous basis. It is also possible to arrange several mixers in series or to coat the proppants in several runs in one mixer. In exemplary mixers it is possible to add components continuously to the heated proppants. For example, isocyanate component and the isocyanate-reactive component may be mixed with the proppant particles in a continuous mixer in one or more steps to make one or more layers of curable coatings. The coated proppants may be allowed to cure at ambient conditions or optionally may be heated to a temperature from 25° C. to 150° C.

Any coating formed on the proppants may be applied in more than one layer. For example, the coating process may be repeated as necessary (e.g. 1-5 times, 2-4 times, and/or 2-3 times) to obtain the desired coating thickness. The thicknesses of the respective coatings of the proppant may be adjusted. For example, the coated proppants may be used as having a relatively narrow range of proppant sizes or as a blended having proppants of other sizes and/or types. For example, the blend may include a mix of proppants having differing numbers of coating layers, so as to form a proppant blend having more than one range of size and/or type distribution.

The coated proppants may be treated with surface-active agents or auxiliaries, such as talcum powder or steatite (e.g., to enhance pourability). The coated proppants may be exposed to a post-coating cure separate from the addition of the curative. For example, the post-coating cure may include the coated proppants being baked or heated for a period of time sufficient to substantially react at least substantially all of the available reactive components used to form the coatings. Such a post-coating cure may occur even if additional contact time with a catalyst is used after a first coating layer or between layers. An optional post-coating cure step may be performed as a baking step at a temperature from 100° C. to 250° C. The post-coating cure may occur for a period of time from 10 minutes to 48 hours.

All parts and percentages are by weight unless otherwise indicated. All molecular weight information is based on number average molecular weight, unless indicated otherwise.

EXAMPLES

Approximate properties, characters, parameters, etc., are provided below with respect to various working examples, comparative examples, and the materials used in the working and comparative examples.

Polyurethane Examples

For polyurethane based examples, the materials principally used, and the corresponding approximate properties thereof, are as follows:

| | |
|---|---|
| Sand | Northern White Frac Sand, having a 20/40 mesh size. |
| Glycerine | A simple polyol having the chemical formula $C_3H_8O_3$ (available from various sources including The Dow Chemical Company). |
| MPEG | A methoxypolyethylene glycol having a number average molecular weight of approximately 350 and an average hydroxyl number range from 154 to 167 mg KOH/g (available as CARBOWAX ™ Methoxypolyethylene glycol 350 from The Dow Chemical Company). |
| Isocyanate | Polymeric diphenylmethane diisocyanate referred to as PMDI (available as PAPI ™ 27 Polymeric MDI from The Dow Chemical Company). |
| Catalyst | A dibutyltin dilaurate based catalyst that promotes the urethane or gelling reaction (available as Dabco ® T-12 from Air Products). |
| Adhesion Promoter | A silane coupling agent, gamma-aminopropyltriethoxysilane (available as Silquest ™ A-1100 from Momentive). |
| Barium Sulfate | A mixture that has 98.9% purity of barium sulfate, described as having approximately 1 µm sized average particles) (available as ExBAR W1 from Excalibur Minerals LLC). |
| Zinc Oxide | A powder that includes zinc oxide, believed to have an aerodynamic particle size from 50-150 nm, (available as MKN-ZnO-050P from MKnano Canada). |
| Silicone | A carbinol functional silicone fluid (available as Dow Corning ® 5562 Carbinol Fluid from The Dow Chemical Company). |
| Fumed Silica | An aqueous dispersion of hydrophilic fumed silica, having a high solids content with an $SiO_2$ content of 30%, an alkaline pH value of from 9.5 to 10.5, nano-sized particles with a mean aggregate size of 0.12 µm (d-50 value by volume), and a viscosity of less than or equal to 1000 mPa · s (at 23° C. and 100 s$^{-1}$) (available as AERODISP ® W 7330 N from Evonik Resource Efficiency GmbH). |
| Minerals | An anti-blocking additive produced from a naturally occurring sodium - potassium - aluminum silicate feedstock (available as MINBLOC ® HC 500 from Sibelco Specialty Minerals). |

The polyurethane based coating is generally prepared by using a process in which from 750 grams of the Sand is heated to a temperature of up to 125° C. in an oven. Then, the heat Sand is introduced into a KitchenAid® mixer equipped with a heating jacket (configured for a temperature of about 70° C.), to start a mixing process. During the above process, the heating jacket is maintained at 60% maximum voltage (maximum voltage is 120 volts, where the rated power is 425 W and rated voltage is 240V for the heating jacket) and the mixer is set to medium speed (speed setting of 5 on based on settings from 1 to 10). Separately, for the Working Examples in the manner indicated below, a mixture of the blend of the Simple Polyol and MPEG is prepared, and then the blend is further mixed with the Catalyst to form the blend with Catalyst. In the mixer, the heated Sand is allowed to attain a temperature of 125° C. Next, simultaneously the addition of the Isocyanate addition and addition of the blend with the Catalyst is performed. A free-flowing product is obtained within a range of approximately 3 to 4 minutes. The surface of the resin coated proppants may be characterized by ATR-IR spectroscopy and/or scanning electron microscopy (SEM). Scanning electron microscopy images (25 kV) of polyurethane based coating on sand is shown, may show the polyurethane based coating is thicker in darker areas and the uncoated sand is lighter. Individual examples are discussed below.

Comparative Example A has an MPEG based coating that includes LOI (loss on ignition that is calculated based on total quantity of resin added to the Sand) ~2%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 12.5 grams of premixed MPEG (12.2 grams) with Catalyst (0.3 grams) is added simultaneously with 2.8 grams of Isocyanate over a period of 1 minute. The mixer is stopped after 1.75 minutes. Material is emptied onto a tray and allowed to cool.

Comparative Example B has a Glycerine based coating that includes LOI~2%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 4.5 grams of premixed Glycerine (4.2 grams) with Catalyst (0.3 grams) is added simultaneously with 10.8 grams of Isocyanate over a period of 1 minute. The mixer is stopped after 1.75 minutes. Material is emptied onto a tray and allowed to cool.

Working Example 1 has a Glycerine/MPEG based coating that includes Glycerine/MPEG weight ratio of 1:1, LOI~2%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 6.5 grams of premixed Glycerine/MPEG (6.2 grams) with Catalyst (0.3 grams) is added simultaneously with 8.8 grams of Isocyanate over a period of 1 minute. The mixer is stopped after 1.75 minutes. Material is emptied onto a tray and allowed to cool.

Working Example 2 has a Glycerine/MPEG based coating that includes Glycerine/MPEG weight ratio of 1:1, LOI~3%, isocyanate index of 0.4, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 8.0 grams of premixed Glycerine/MPEG (7.7 grams) with Catalyst (0.3 grams) is added simultaneously with 7.3 grams of Isocyanate over a period of 1 minute. The mixer is stopped after 1.75 minutes. Material is emptied onto a tray and allowed to cool.

Working Example 3 has a Glycerine/MPEG based coating that includes Glycerine/MPEG weight ratio of 1:1, LOI~3%, isocyanate index of 0.5, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 7.2 grams of premixed Glycerine/MPEG (6.9 grams) with Catalyst (0.3 grams) is added simultaneously with 8.1 grams of Isocyanate over a period of 1 minute. The mixer is stopped after 1.75 minutes. Material is emptied onto a tray and allowed to cool.

Working Example 4 has a Glycerine/MPEG based coating that includes Glycerine/MPEG weight ratio of 4:6, LOI~2%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 7.2 grams of premixed Glycerine/MPEG (6.9 grams) with Catalyst (0.3 grams) is added simultaneously with 8.1 grams of Isocyanate over a period of 1 minute. The mixer is stopped after 1.75 minutes. Material is emptied onto a tray and allowed to cool.

Working Example 5 has a Glycerine/MPEG based coating that includes Glycerine/MPEG weight ratio of 6:4, LOI~2%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 6.0 grams of premixed Glycerine/MPEG (5.7 grams) with Catalyst (0.3 grams) is added simultaneously with 9.3 grams of Isocyanate over a period of 1 minute. The mixer is stopped after 1.75 minutes. Material is emptied onto a tray and allowed to cool.

Comparative Example C has a Glycerine/MPEG based coating that includes Glycerine/MPEG weight ratio of 1:1, LOI~3%, isocyanate index of 0.2, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 10.5 grams of premixed Glycerine/MPEG (10.2 grams) with Catalyst (0.3 grams) is added simultaneously with 4.8 grams of Isocyanate over a period of 1 minute. The mixer is stopped after 1.75 minutes. Material is emptied onto a tray and allowed to cool.

Comparative Example D has a Glycerine/MPEG based coating that includes Glycerine/MPEG weight ratio of 1:1, LOI~3%, isocyanate index of 1.0, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 4.8 grams of premixed Glycerine/MPEG (4.5 grams) with Catalyst (0.3 grams) is added simultaneously with 10.5 grams of Isocyanate over a period of 1 minute. The mixer is stopped after 1.75 minutes. Material is emptied onto a tray and allowed to cool.

Comparative Example E has a Glycerine/MPEG based coating that includes Glycerine/MPEG weight ratio of 19:1, LOI~3%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 4.6 grams of premixed Glycerine/MPEG (4.3 grams) with Catalyst (0.3 grams) is added simultaneously with 10.7 grams of Isocyanate over a period of 1 minute. The mixer is stopped after 1.75 minutes. Material is emptied onto a tray and allowed to cool.

Comparative Example F has a Glycerine/MPEG based coating that includes Glycerine/MPEG weight ratio of 1:19, LOI~3%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 11.4 grams of premixed Glycerine/MPEG (11.1 grams) with Catalyst (0.3 grams) is added simultaneously with 3.9 grams of Isocyanate over a period of 1 minute. The mixer is stopped after 1.75 minutes. Material is emptied onto a tray and allowed to cool.

Working Example 6 has a Glycerine/MPEG based coating that includes Glycerine/MPEG weight ratio of 1:1, 1.5 wt % of Barium Sulfate in the coating (based on total weight of coated sand), LOI~3%, isocyanate index of 0.6, and cycle time of 3 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 21.5 grams of premixed Glycerine/MPEG (9.5 grams), Barium Sulfate (11.6 grams), and Catalyst (0.4 grams) is added simultaneously with 13.2 grams of Isocyanate over a period of 1 minute. The mixer is stopped after 1.75 minutes. Material is emptied onto a tray and allowed to cool.

Working Example 7 has a Glycerine/MPEG based coating that includes Glycerine/MPEG weight ratio of 1:1, 0.9 wt % of Zinc Oxide in the coating (based on total weight of coated sand), LOI~3%, isocyanate index of 0.6, and cycle time of 3 minutes. The samples are prepared using 750 grams of the Sand (except 20/30 mesh was used instead of 20/40) is heated in an oven to 125° C., then introduced into the KitchenAid® mixer. With the temperature of the Sand being 120° C., 0.6 mL of the Adhesion Promoter is added to the mixer. Then, 15 seconds from start of addition of the Adhesion Promoter, 16.9 grams of premixed Glycerine/MPEG (9.5 grams), Zinc Oxide (7.0 grams), and Catalyst (0.4 grams) is added simultaneously with 13.2 grams of Isocyanate over a period of 1 minute. The mixer is stopped after 1.75 minutes. Material is emptied onto a tray and allowed to cool.

Working Example 8 has a Glycerine/MPEG based coating that includes Glycerine/MPEG weight ratio of 1:1, 400 ppm (based on total weight of the Sand) of Silicone, 0.3 wt % of Fumed Silica in the coating (based on total weight of coated sand), LOI~2%, isocyanate index of 0.6, and cycle time of 4 minutes. The samples are prepared using 750 grams of the Sand is heated in an oven to 125° C., then introduced into the KitchenAid® mixer. With the temperature of the Sand being 125° C., 0.6 mL of the Adhesion Promoter is added to the mixer. Then, 15 seconds from start of addition of the Adhesion Promoter, 6.5 grams of premixed Glycerine/MPEG (6.2 grams) with Catalyst (0.3 grams) is added simultaneously with 8.8 grams of Isocyanate over a period of 1.25 minutes. After 75 seconds from the end of the addition of the Isocyanate, 0.3 grams of Silicone is added over 5 seconds and then 2.5 grams of Fumed Silica is added over 15 seconds. The mixer is stopped after 45 seconds. Material is emptied onto a tray and allowed to cool.

The effect of the coatings of Working Examples 1 to 8 and Comparative Examples A to G are shown in Table 1, below.

The coated samples are placed in a compression mold and treated with water or 2% KCl (~1 mL for every 7.5 grams of the coated sample). The outer surface of the mold is heated to the indicated temperature using a heat tape and compressed at 1000 psi for 12 hours. Upon demolding, the compressed sample is referred to as a "plug" and is placed in an electromechanical tester and the yield stress (UCS) is measured using a 22 lb load cell at strain rate of 0.01"/min.

TABLE 1

| Ex. | Isocyanate Reactive Component | Isocyanate Index | Unconfined Compressive Strength (50° C., 1000 psi for 24 hours) |
|---|---|---|---|
| A | MPEG | 0.6 | No plug |
| B | Glycerine | 0.6 | No plug |
| C | Glycerine/MPEG (1:1) | 0.2 | N/A |
| D | Glycerine/MPEG (1:1) | 1.0 | No plug |
| E | Glycerine/MPEG (19:1) | 0.6 | No plug |
| F | Glycerine/MPEG (1:19) | 0.6 | No plug |
| G | Fairmount Santrol COOLSET® | — | 21 |
| 1 | Glycerine/MPEG (1:1) | 0.6 | 34 |
| 2 | Glycerine/MPEG (1:1) | 0.4 | 44 |
| 3 | Glycerine/MPEG (1:1) | 0.5 | 42 |
| 4 | Glycerine/MPEG (4:6) | 0.6 | N/A |
| 5 | Glycerine/MPEG (6:4) | 0.6 | N/A |
| 6 | Glycerine/MPEG (1:1) with 1.5 wt % Barium Sulfate | 0.6 | N/A |
| 7 | Glycerine/MPEG (1:1) with 0.9 wt % Zinc Oxide | 0.6 | N/A |
| 8 | Glycerine/MPEG (1:1) with 400 ppm of Silicone and 0.3% of Fumed Silica | 0.6 | N/A |

Unconfined compressive strength (UCS) is measured using an MTS Insight electromechanical compression tester and a sample temperature of 50° C., except for Comparative Example G. More specifically, for forming the "plug", the customized molds (3 parts—1 inch inner diameter, 1⅜" outer diameter) are obtained from Collin Instruments, the pressure is controlled using a hot press (----), and the temperature is controlled using a heat tape from (Brisk Heat). Solid wax is used around the sides of the molds to provide lubrication aiding in the removal of the plugs from the mold. Typically, 25-30 grams of coated sample is poured into the mold after locking the mold at the bottom (sealing the mold at the bottom using Teflon tape), heat tape is wrapped around the mold. Subsequently, 3-5 ml of water or 2% aqueous KCl solution is poured into the mold. The top part of the mold is then inserted and the assembly is placed inside the hot press. The hot press pressure is setup at the desired pressure (e.g., 0.785 k lbs=1000 psig pressure on the mold), temperature (normally set at 90° F.) and time (12 hours). After the coated sample is compressed at a certain temperature, pressure, and time, the resultant sample plug is pushed out of the mold and allowed to dry overnight before the UCS measurements is performed. Though, for Comparative Example G, The UCS value is quoted from the technical data sheet of Fairmount Santrol.

Working Example 6 is further evaluated for the ability of the coating to serve as an effective matrix for Radium capture, and is found to have a Radium Capture of 72%. Accordingly, it is found that 72 wt % of the $^{223}$Ra originally provided in a radium stock solution is removed from the solution by use of the coated sand of Working Example 4, and 28 wt % of the $^{223}$Ra remains in a supernatant liquid.

The Radium Capture is measured by gamma spectroscopy. The media used for the test is a simulated brine containing 5% NaCl, 2.6% $CaCl_2$ that was spiked with 5560 pCi/L of $Ra^{226}$. The proppant concentration in the brine is 33 wt %. In particular, 250 grams of Working Example 4 is added to a 1000 mL amber glass container. Then, 500 mL of the brine solution was added and the container was placed in an oven at 70° C. with occasional agitation over a 24 h period. Upon exposure for 24 h, the solids and liquids were separated by vacuum filtration using a 0.45 micron filter. The resulting liquid phase was analyzed for radium-226 activity by high purity gamma spectrometry.

Working Example 7 is further evaluated for the ability of the coating to serve as an effective matrix for H2S capture, and is found to have a $H_2S$ Capture of 89%. Accordingly, it is found that 89 wt % of the $H_2S$ originally provided in a solution is removed by use of the coated sand of Working Example 7, and 11 wt % of the $H_2S$ remains in the solution.

$H_2S$ capture is measured by gas chromatography and the percent capture is based on the vapor-liquid equilibrium assumption. The initial head space concentration of $H_2S$ is 3133 ppmv. The media used for the test is deionized water and the proppant concentration is 20 wt %. Hydrogen sulfide capture studies are performed, by using 2.0 grams of each sample, which is weighted into a 22-mL headspace GC vial with a stir bar. Deionized water (10 mL) is then added into each vial and sealed with a PTFE lined silicon crimp cap. Hydrogen sulfide gas (1.5 mL, STP equivalent to 2.28 mg) is injected into the headspace of each vial. The vials are then heated at 70° C. in an aluminum heating block on top of a stirring hot plate for 1 hour, after which the vials are cooled and the $H_2S$ concentrations in the headspace of the vials are analyzed by headspace gas chromatography. Each sample is prepared in duplicate.

Working Example 6 is further evaluated for flowability in a dry state, by evaluating dry caking of the samples after being allow to cool for a period of 24 hours. It is found that for Working Examples 6, free flowing coated sand is observed, even after exposure to elevated temperatures and pressures for a period of 6 hours.

Dry caking is evaluated is a setup that includes a cup containing 200 g of Working Example 6, a mold with 3 inch diameter cross section facing the Sand and 4 inch cross section of the top where weights are stacked thereon, and 42 pounds of weight stacked up to generate a pressure of 6 psi on the 3 inch cross section. The setup is placed in the oven at 60° C. for a period of 6 hours. After 6 hours, the weights are removed and the mold is removed to observe formation of a caked clusters or free flowing coated sand.

Scanning Electron Microscopy (SEM) imaging for the coatings may be obtained using an FEI Nova NanoSEM 600 scanning electron microscope equipped with backscatter electron detector (vCD), and a secondary electron detector (TLD). Resin coated sand specimens were prepared for (1) low magnification top-down imaging using a vCD detector in Field Free lens mode, and (2) high magnification specimens were prepared for top-down imaging using mixed vCD and TLD detectors in Immersion lens mode. For the (1) low magnification imaging, a small amount of the sand is placed into a shallow dish and sputter coated with Au/Pd for 20 seconds. The specimen is removed from the sputter coater, gently shaken to expose the uncoated side of the sand, and sputter coated again. This is performed for a total of three times ensuring that a thin coating of metal is applied to the resin coated sand surface. The Au/Pd coated sand is then mounted to an aluminum stub using carbon tape. The mounted specimens are then sputter coated for 15 seconds with Ir. Low magnification images were obtained at 10 kV accelerating voltage revealing the overall distribution on the resin coated sand. For the (2) high magnification imaging, a small amount of resin coated sand was mounted directly onto an aluminum stub using a fast setting, five minute epoxy. The specimen was then sputter coated for 15 seconds with Ir. High magnification images were acquired at 5 kV accelerating voltage using mixed detector signal (both vCD and TLD).

The invention claimed is:

1. A proppant, comprising:
   a base substrate; and
   one or more polyurethane based coatings on an outer surface of the base substrate, the one or more polyurethane based coatings including the reaction product of an isocyanate component that includes at least one isocyanate and an isocyanate-reactive component that includes one or more polyols and one or more polyether monols at a ratio from 1:18 to 18:1, an isocyanate index being greater than 0.2 and less than 1.0.

2. The proppant as claimed in claim 1, wherein the one or more polyols have a number average molecular weight that is less than 400 g/mol.

3. The proppant as claimed in claim 1, wherein the one or more polyether monols have a number average molecular weight that is less than 1000 g/mol.

4. The proppant as claimed in claim 1, wherein the ratio of polyol to monol is from 1:3 to 3:1.

5. The proppant as claimed in claim 1, wherein at least one of the one or more polyurethane based coatings includes a carbinol functional silicone.

6. The proppant as claimed in claim 1, wherein at least one of the one or more polyurethane based coatings includes a carbinol functional silicone having defined by at least one of the Structures 1(a) and 1(b):

Structure 1(a)

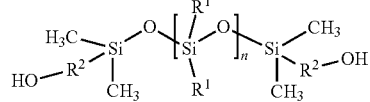

Structure 1(b)

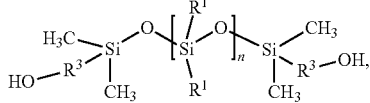

wherein for Structures 1(a) and 1(b) each $R^1$ is independently a methyl, ethyl, propyl, or phenyl and n is an integer from 2 to 200, for Structure 1(a) $R^2$ is a branched or linear hydrocarbylene comprising from 2 to 100 carbon atoms, and for Structure 1(b) $R^3$ has the Structure 2:

Structure 2

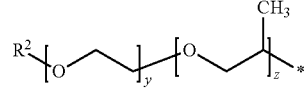

wherein for Structure 2 y is an integer from 0 to 50, z is an integer from 0 to 50, and $R^2$ is a branched or linear hydrocarbylene comprising from 2 to 100 carbon atoms.

7. The proppant as claimed in claim 1, wherein at least one of the one or more polyurethane based coatings includes fumed silica.

8. The proppant as claimed in claim 1, wherein at least one of the one or more polyurethane based coatings includes from 0.1 wt % to 1.9 wt % of fumed silica, based on a total weight of the coated article, the fumed silica being a dispersion having a $SiO_2$ content from 10 wt % to 40 wt %, based on a total weight of the fumed silica, and a mean aggregate particle size from 0.01 μm to 0.50 μm.

9. A process of preparing a proppant as claimed in claim 1, the process comprising:
  providing the base substrate; and
  forming the one or more polyurethane based coatings on an outer surface of the base substrate.

10. The proppant as claimed in claim 1, wherein the proppant is used in well fracturing.

* * * * *